United States Patent
Nakamura

(10) Patent No.: US 8,403,853 B2
(45) Date of Patent: Mar. 26, 2013

(54) ULTRASONIC DIAGNOSTIC APPARATUS

(75) Inventor: Yasuhiro Nakamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1210 days.

(21) Appl. No.: 11/569,828

(22) PCT Filed: Jun. 1, 2005

(86) PCT No.: PCT/JP2005/010082
§ 371 (c)(1),
(2), (4) Date: May 7, 2007

(87) PCT Pub. No.: WO2005/117709
PCT Pub. Date: Dec. 15, 2005

(65) Prior Publication Data
US 2007/0266791 A1  Nov. 22, 2007

(30) Foreign Application Priority Data
Jun. 2, 2004 (JP) .................. 2004-164862

(51) Int. Cl.
*A61B 8/00* (2006.01)
(52) U.S. Cl. ............... 600/443; 600/437; 73/627
(58) Field of Classification Search ........... 600/443; 73/627, 629
See application file for complete search history.

(56) References Cited

U.S. PATENT DOCUMENTS

| | | | | |
|---|---|---|---|---|
| 4,197,750 A | * | 4/1980 | Hassler | 73/629 |
| 4,289,140 A | * | 9/1981 | Carpenter et al. | 600/443 |
| 5,311,870 A | * | 5/1994 | Fukukita et al. | 600/455 |
| 5,327,892 A | * | 7/1994 | Nakamura et al. | 600/443 |
| 5,394,750 A | * | 3/1995 | Matzuk | 73/629 |
| 5,507,293 A | * | 4/1996 | Tannaka et al. | 600/447 |
| 5,668,746 A | * | 9/1997 | Iwaki et al. | 708/317 |
| 7,010,979 B2 | * | 3/2006 | Scott | 73/596 |
| 7,530,955 B2 | * | 5/2009 | Diab et al. | 600/502 |

FOREIGN PATENT DOCUMENTS

| | | | |
|---|---|---|---|
| JP | 5-111486 | | 5/1993 |
| JP | 6-154210 | | 6/1994 |
| JP | 6-313764 | | 11/1994 |
| JP | 7-171152 | | 7/1995 |
| JP | 07192398 A | * | 7/1995 |
| JP | 9-327461 | | 12/1997 |
| JP | 11-169374 | | 6/1999 |

* cited by examiner

*Primary Examiner* — Tse Chen
*Assistant Examiner* — Patricia Park
(74) *Attorney, Agent, or Firm* — Pearne & Gordon LLP

(57) ABSTRACT

A technology for providing a small and inexpensive ultrasonic diagnostic apparatus which does not need a high resolution A/D converter, and has high sensitivity and a wide dynamic range is disclosed. According to the technology, an ultrasonic transducer unit 1 for transmitting and receiving ultrasonic wave is driven by a drive circuit 2 for generating a pulse signal. An echo signal received by the ultrasonic transducer unit is inputted to an analog low frequency band attenuator 3 which attenuates a low frequency band component. An output signal of the analog low frequency band attenuator is inputted to an A/D converter 4 which converts the signal to a digital signal. The converted and outputted digital signal is inputted to a digital correction filter 5 which intensifies the low frequency band component attenuated by the analog low frequency band attenuator and outputs a digital signal having a frequency distribution almost equal to that of the echo signal received by the ultrasonic transducer unit.

1 Claim, 8 Drawing Sheets

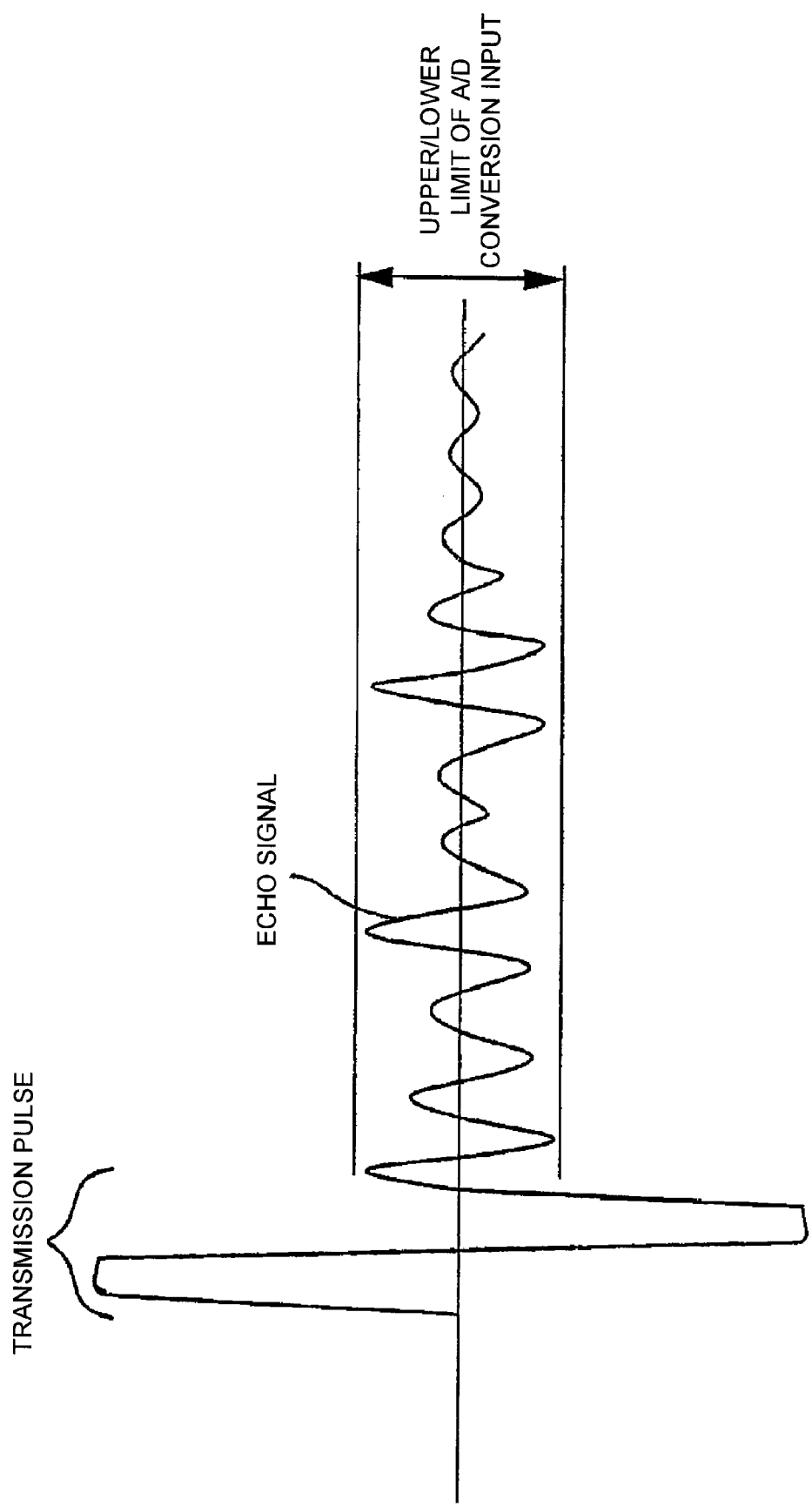

ULTRASONIC DIAGNOSTIC APPARATUS

TECHNICAL FIELD

The present invention relates to an ultrasonic diagnostic apparatus which transmits an ultrasonic pulse to a living body, synthesizes a receiving signal of reflection wave from the living body, and thereby obtains an ultrasonic tomogram.

BACKGROUND ART

In the past, ultrasonic diagnostic apparatuses which give a drive pulse from a drive circuit to an ultrasonic transducer unit, transmit ultrasonic wave from the ultrasonic transducer unit to a target region, receive an echo signal from the target region by the ultrasonic transducer unit, perform processing such as amplification, addition, and logarithmic compression to obtain image data, transmit the image data to a monitor, and thereby display a desired diagnostic image on the monitor have been disclosed (for example, refer to the following Patent Document 1).

Further, ultrasonic signal processing apparatuses which, in processing an echo signal, convert an analog receiving signal received by an ultrasonic transducer unit to a digital signal, multiply the digital signal by a reference signal in a given frequency, and thereby convert an signal waveform thereof have been disclosed (for example, refer to the following Patent Document 2). Furthermore, ultrasonic diagnostic apparatuses which convert an analog receiving signal to a digital signal, synthesize the obtained digital data, and thereby obtain an ultrasonic tomogram have been disclosed (for example, refer to the following Patent Document 3).

FIG. 6 is a block diagram showing a schematic structure of an ultrasonic wave transmitting/receiving section and a signal conversion section in the foregoing ultrasonic signal processing apparatus and the foregoing ultrasonic diagnostic apparatus which convert an analog receiving signal to a digital signal. The transmitting/receiving section and the signal conversion section include an ultrasonic transducer unit 1 for transmitting ultrasonic wave and receiving an echo signal, a drive circuit 2 for transmitting a drive pulse to the ultrasonic transducer unit 1 according to a trigger signal, and an A/D converter 4 for converting the echo signal received by the ultrasonic transducer unit 1 to a digital signal and outputting the resultant signal.

In this case, the echo signal received by the ultrasonic transducer unit 1 is a large amplitude signal in a superficial part and is a weak signal in a deep part. In result, in some cases, a resolution (bit number) of the A/D converter 4 falls short (bit number is small). Therefore, in actual ultrasonic diagnostic apparatuses, an unshown preamplifier and an unshown variable gain amplifier (VCA) are connected between the ultrasonic transducer unit 1 and the A/D converter 4. Thereby, the amplitude of the echo signal is controlled, a dynamic range thereof is decreased, and then a resultant signal is inputted to the A/D converter 4.

Patent Document 1: Japanese Patent Application Publication No. 6-154210 (paragraph 0011, FIG. 1)
Patent Document 2: Japanese Patent Application Publication No. 6-313764 (paragraph 0008, FIG. 1)
Patent Document 3: Japanese Patent Application Publication No. 7-171152 (paragraph 0023, FIG. 1)

However, in the foregoing ultrasonic signal processing apparatus and the foregoing ultrasonic diagnostic apparatus, immediately after the drive circuit 2 transmits a large amplitude pulse to drive the ultrasonic transducer unit 1, ringing having a low frequency component is caused by influences of an piezoelectric device and a cable which compose the ultrasonic transducer unit 1. In result, as shown in FIG. 7, ringing of a large amplitude pulse is overlaid on an echo signal of a superficial part obtained immediately after driven by a transmission pulse. Therefore, to sufficiently input the echo signal of the superficial part to the A/D converter 4 within the input upper/lower limit range indicated by an arrow, it is necessary to use the A/D converter 4 with a large bit number so that gain is lowered in the superficial part. However, the resolution of the A/D converter capable of being practically realized inexpensively is about 12 bits. By using such an A/D converter, only a dynamic range of about 60 dB can be handled. Further, a gain variable range of a variable gain amplifier is about 40 to 60 dB. Therefore, for example, to handle an echo signal on which ringing of 120 dB is overlaid, the bit number falls short. The foregoing ultrasonic signal processing apparatus and the foregoing ultrasonic diagnostic apparatus have been developed to resolve such a problem. However, in the foregoing ultrasonic signal processing apparatus and the foregoing ultrasonic diagnostic apparatus, there have been problems that the structure becomes complex, and the apparatus becomes large and expensive.

DISCLOSURE OF THE INVENTION

In order to solve the above problems of the foregoing existing apparatuses, it is an object of the invention to provide a small and inexpensive ultrasonic diagnostic apparatus which does not need a high resolution A/D converter, and has high sensitivity and a wide dynamic range.

To attain the foregoing object, in the invention according to claim 1, the ultrasonic diagnostic apparatus is structured as follows. An ultrasonic transducer unit for transmitting and receiving ultrasonic wave is driven by a drive circuit for generating a pulse signal. An echo signal received by the ultrasonic transducer unit is inputted to an analog low frequency band attenuator which attenuates a low frequency band component. An output signal of the analog low frequency band attenuator is inputted to an A/D converter which converts the signal to a digital signal. The converted and outputted digital signal is inputted to a digital correction filter which intensifies the low frequency band component attenuated by the analog low frequency band attenuator and outputs a digital signal having a frequency distribution almost equal to that of the echo signal received by the ultrasonic transducer unit.

By the foregoing structure, a small and inexpensive ultrasonic diagnostic apparatus which does not need a high resolution A/D converter, and has high sensitivity and a wide dynamic range can be provided.

In the invention according to claim 2, the ultrasonic diagnostic apparatus is structured as follows. In the analog low frequency band attenuator, the echo signal received by the ultrasonic transducer unit is amplified by a preamplifier, the low frequency band component is attenuated by a low frequency band attenuating filter, and then an attenuated portion of the echo signal is corrected by a variable gain amplifier.

By the foregoing structure, in A/D converting the echo signal, it is possible that a ringing component in the low frequency band is removed to decrease the dynamic range of the signal, and a resultant signal is inputted to the A/D converter.

According to the invention, a small and inexpensive ultrasonic diagnostic apparatus which does not need a high resolution A/D converter, and has high sensitivity and a wide dynamic range can be provided.

BRIEF DESCRIPTION OF THE DRAWINGS

FIG. 3 is a diagram showing an echo signal waveform added to an A/D converter for explaining operations of the embodiment of the invention;

BEST MODE FOR CARRYING OUT THE INVENTION

Figure 1:
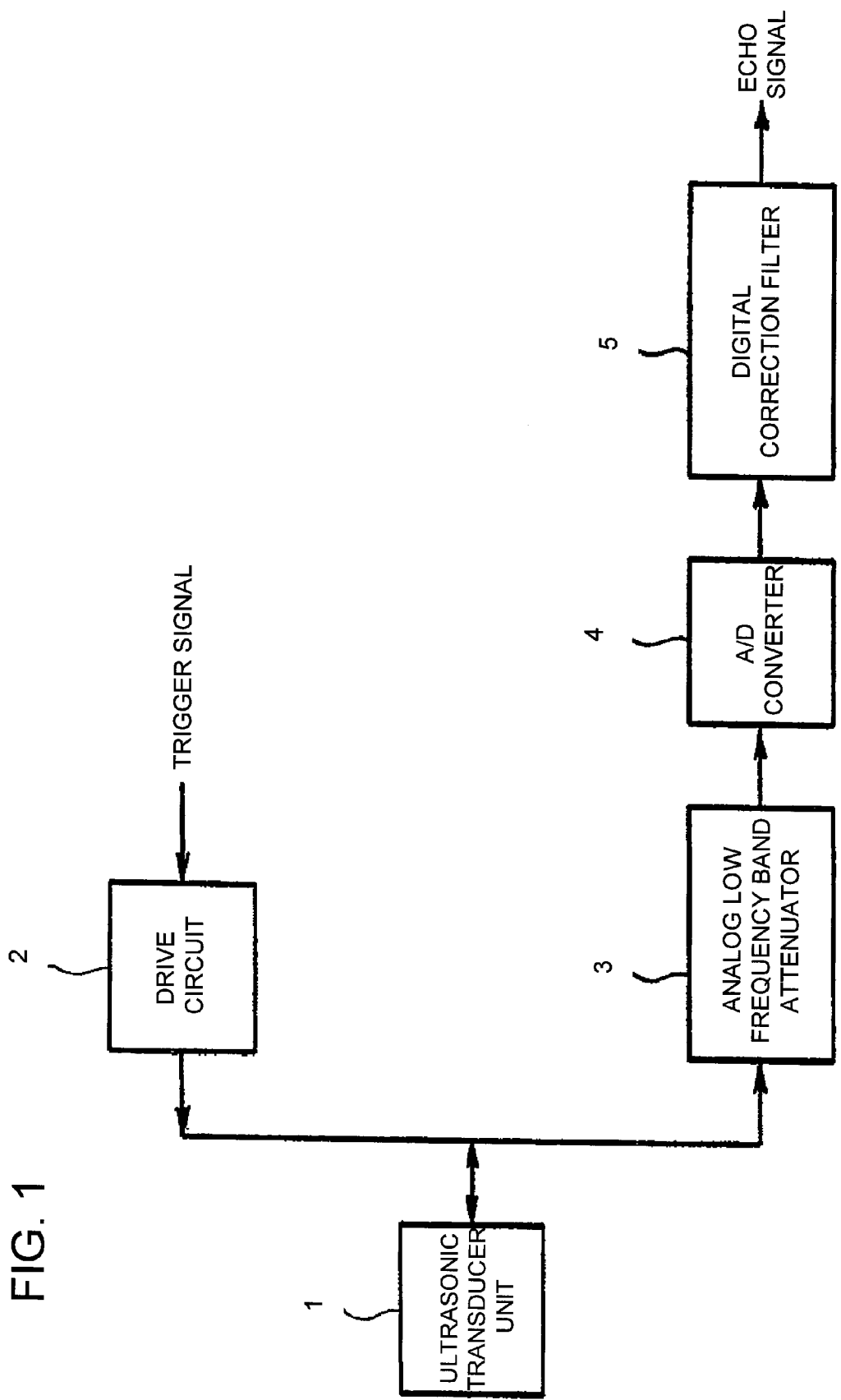
FIG. 1 is a block diagram showing a schematic structure of an ultrasonic wave transmitting/receiving section and a signal conversion section in an embodiment of an ultrasonic diagnostic apparatus according to the invention.

A description will be hereinafter given of the invention in detail based on a preferred embodiment shown in the drawings.

FIG. 1 is a block diagram showing a schematic structure of an ultrasonic wave transmitting/receiving section and a signal conversion section in this embodiment of an ultrasonic diagnostic apparatus according to the invention. The transmitting/receiving section and the signal conversion section include an ultrasonic transducer unit 1 for transmitting ultrasonic wave and receiving an echo signal, a drive circuit 2 for transmitting a drive pulse to the ultrasonic transducer unit 1 according to a trigger signal, an analog low frequency band attenuator 3 to which the echo signal received by the ultrasonic transducer unit 1 is inputted and which attenuates a low frequency band component and outputs a resultant signal, an A/D converter 4 to which the echo signal which has passed the analog low frequency band attenuator 3 is inputted and which A/D converts the echo signal and outputs a resultant signal, and a digital correction filter 5 for intensifying frequency characteristics opposite of those of the analog low frequency band attenuator 3, that is, intensifying the low frequency band component, restoring the echo signal to an echo signal having frequency spectrum distribution characteristics with a flat shape from the low frequency band to the high frequency band of the echo signal, and outputting the resultant signal.

Figure 2:
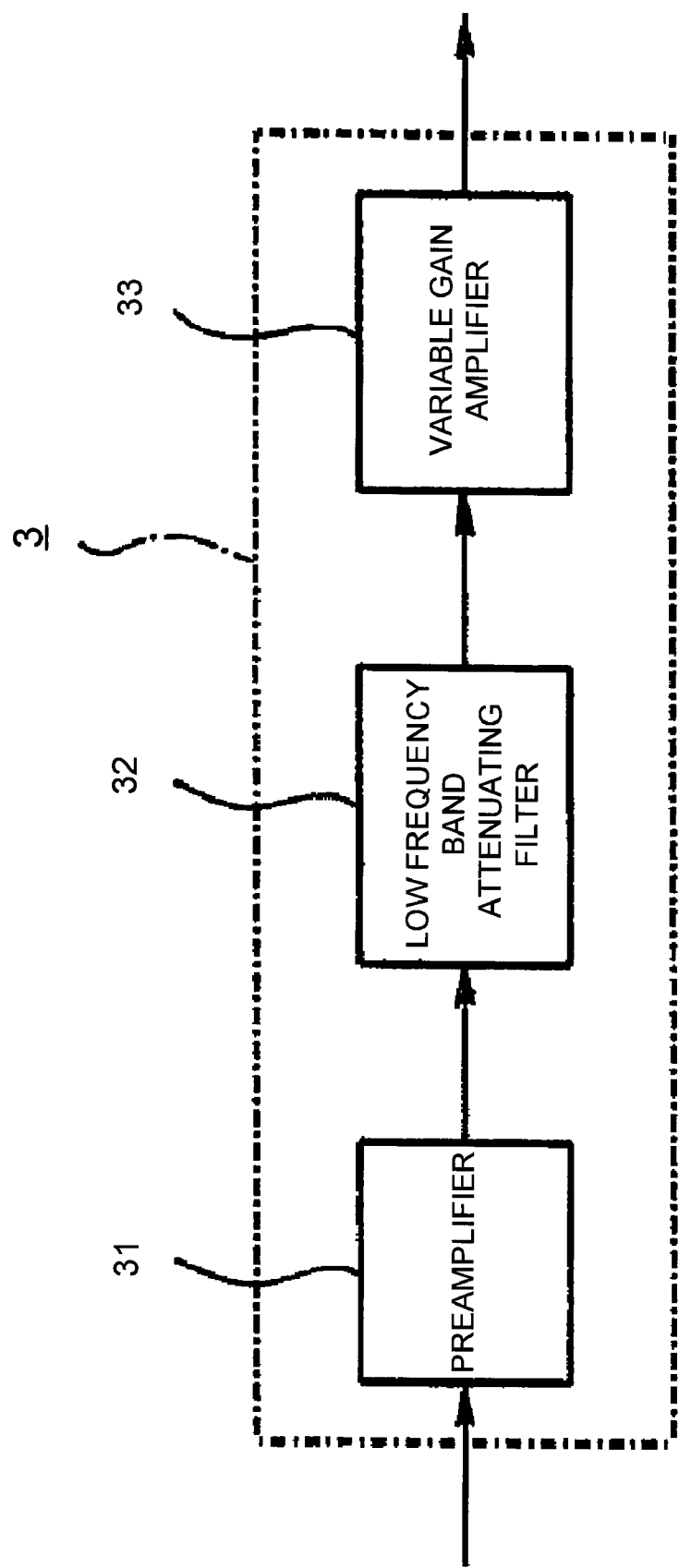
FIG. 2 is a block diagram showing a detailed structure of an analog low frequency band attenuator composing the embodiment of the invention.

FIG. 2 is a block diagram showing a detailed structure of the analog low frequency band attenuator 3. The analog low frequency band attenuator 3 includes a preamplifier 31 for amplifying the echo signal received by the ultrasonic transducer unit 1, a low frequency band attenuating filter 32 to which the echo signal amplified by the preamplifier 31 is inputted and which attenuates the low frequency band component and outputs a resultant signal, and a variable gain amplifier 33 for inputting the echo signal outputted from the low frequency band attenuating filter 32, correcting an attenuated portion of the echo signal according to transmission time, and outputting a resultant signal.

A description will be hereinafter given of operations of this embodiment of the invention which is structured as above with reference to FIG. 3 to FIG. 5.

Figure 7:
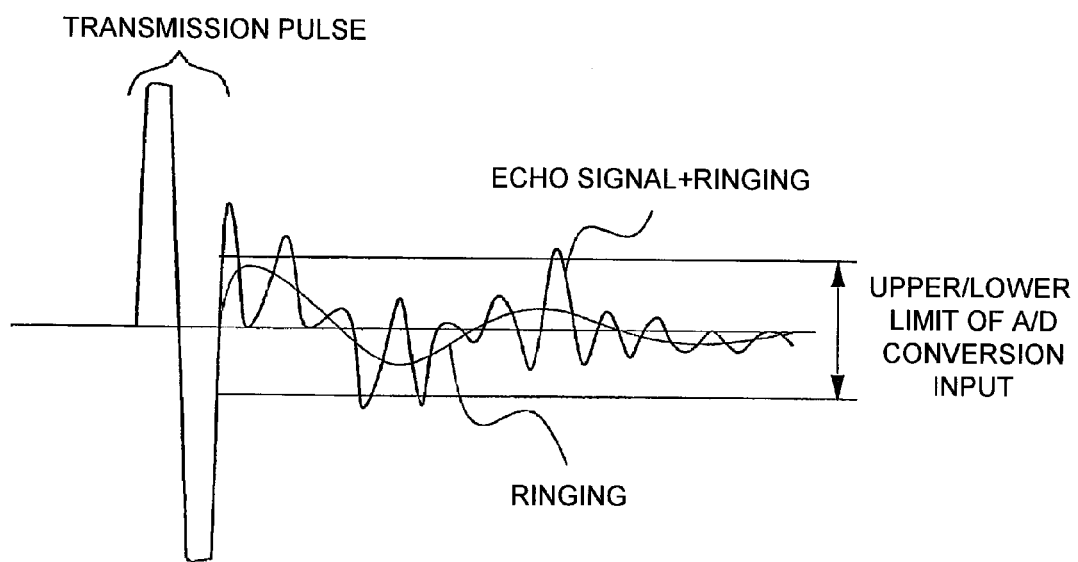
FIG. 7 is a diagram showing an echo signal waveform added to an A/D converter for explaining operations of the existing ultrasonic signal processing apparatus and the existing ultrasonic diagnostic apparatus.

When the drive circuit 2 drives the ultrasonic transducer unit 1 by a large amplitude pulse, as shown in FIG. 7 used for explaining the existing apparatuses, an echo signal on which ringing is overlaid is added to the analog low frequency band attenuator 3. Since the analog low frequency band attenuator 3 includes the low frequency band attenuating filter 32, the ringing having a low frequency component shown in FIG. 7 is removed. Thus, as shown in FIG. 3, an echo signal falling within the upper/lower limit range of A/D conversion input is inputted to the A/D converter 4. The echo signal is converted to a digital signal by the A/D converter 4, and the resultant signal is added to the digital correction filter 5. The digital correction filter 5 intensifies the low frequency band component attenuated by the low frequency band attenuating filter 32, and outputs a resultant signal. Thereby, a digital echo signal waveform having the same frequency distribution as that of a waveform of the signal inputted to the analog low frequency band attenuator 3 can be obtained.

In this case, in the analog low frequency band attenuator 3, the echo signal received by the ultrasonic transducer unit 1 is amplified by the preamplifier 31, the low frequency band component is attenuated by the low frequency band attenuating filter 32, and then an attenuated portion of the echo signal is corrected according to transmission time by the variable gain amplifier 33.

Figure 4A:
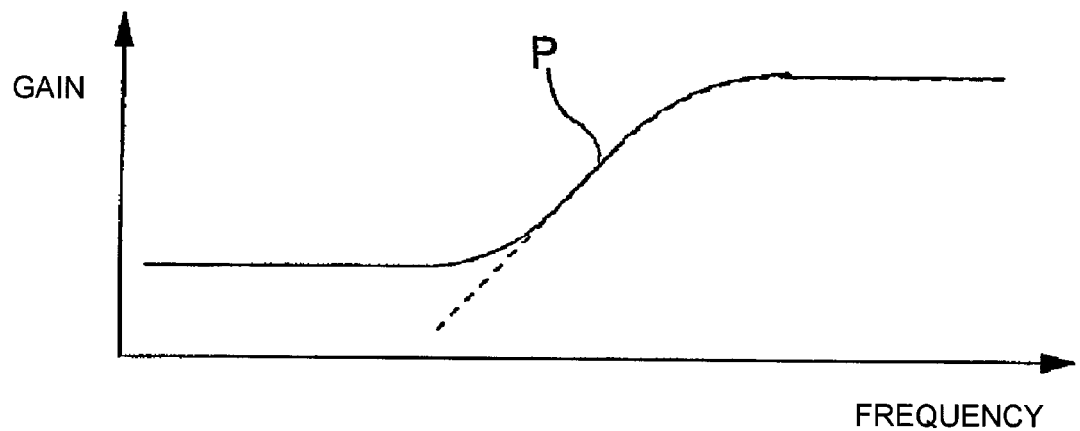
FIG. 4A is a diagram showing frequency characteristics of a low frequency band attenuating filter for explaining operations of the embodiment of the invention.
Figure 4B:
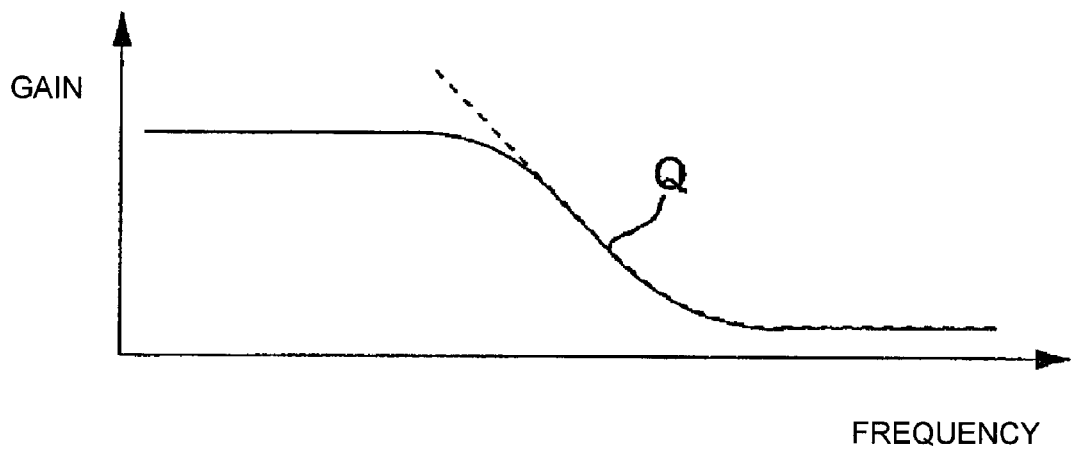
FIG. 4B is a diagram showing frequency characteristics of a digital correction filter for explaining operations of the embodiment of the invention.

FIG. 4A is a diagram showing frequency characteristics of the low frequency band attenuating filter 32, that is, a relation between frequencies and gains. As indicated by curved line P, it shows that almost constant low gain is kept in the low frequency band, the gain is increased at a given change ratio in the intermediate frequency band, and almost constant high gain is kept in the high frequency band. FIG. 4B is a diagram showing frequency characteristics of the digital correction filter 5, that is, a relation between frequencies and gains. As indicated by curved line Q, it shows that almost constant high gain is kept in the low frequency band, the gain is decreased at a given change ratio in the intermediate frequency band, and almost constant low gain is kept in the high frequency band. That is, the digital correction filter 5 functions as an opposite filter in relation to the low frequency band attenuating filter 32.

Figure 5A:
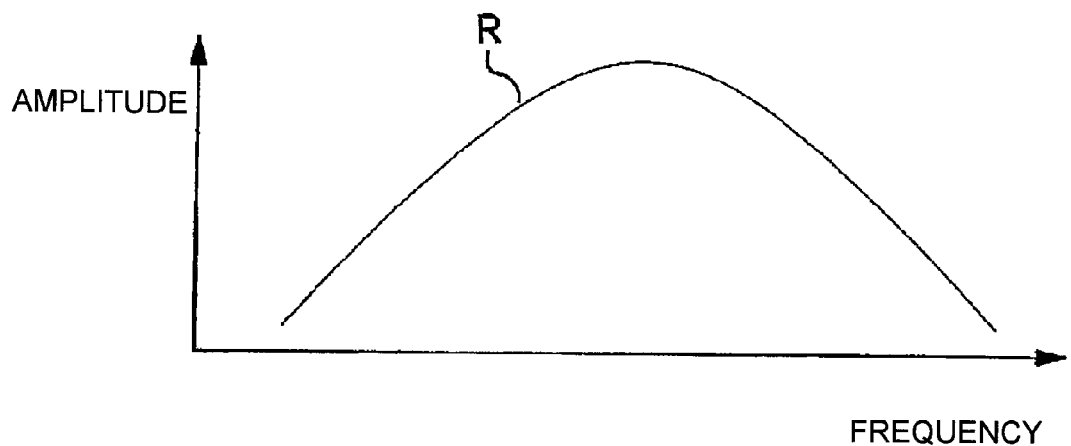
FIG. 5A is a diagram showing an example of a frequency distribution of an echo signal received by an ultrasonic transducer unit as an input to a low frequency band attenuator for explaining operations of the embodiment of the invention.
Figure 5B:
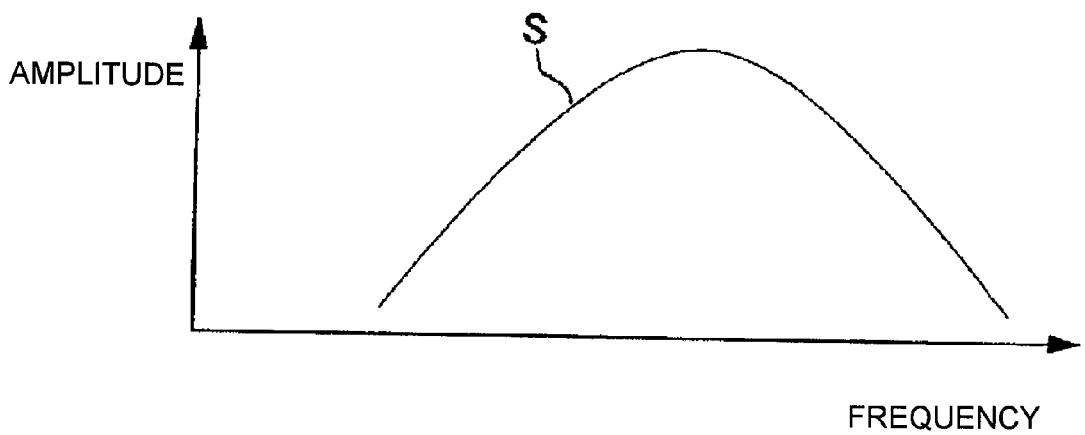
FIG. 5B is a diagram showing an example of a frequency distribution of an echo signal which has passed an analog low frequency band attenuator as an output of the low frequency band attenuator for explaining operations of the embodiment of the invention.
Figure 5C:
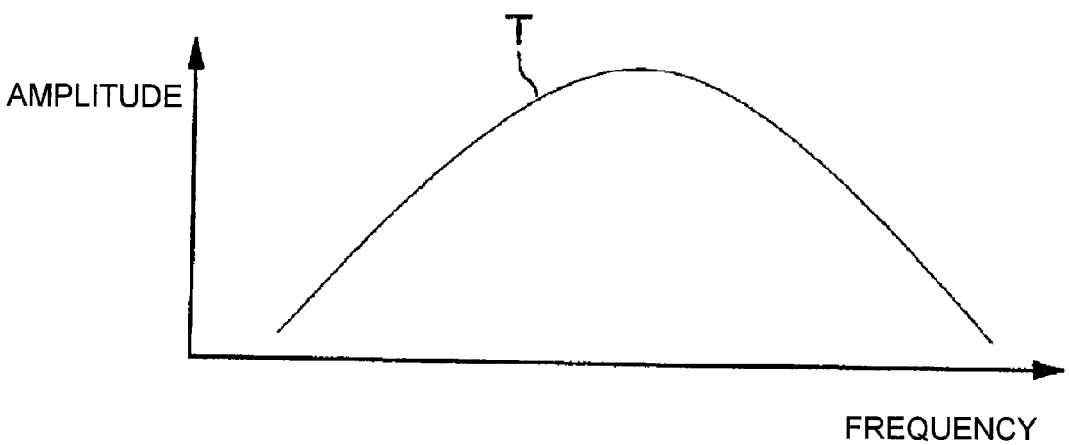
FIG. 5C is a diagram showing an example of a frequency distribution of an echo signal with a low frequency band component intensified by the digital correction filter as an output of the digital correction filter for explaining operations of the embodiment of the invention.
Figure 5D:
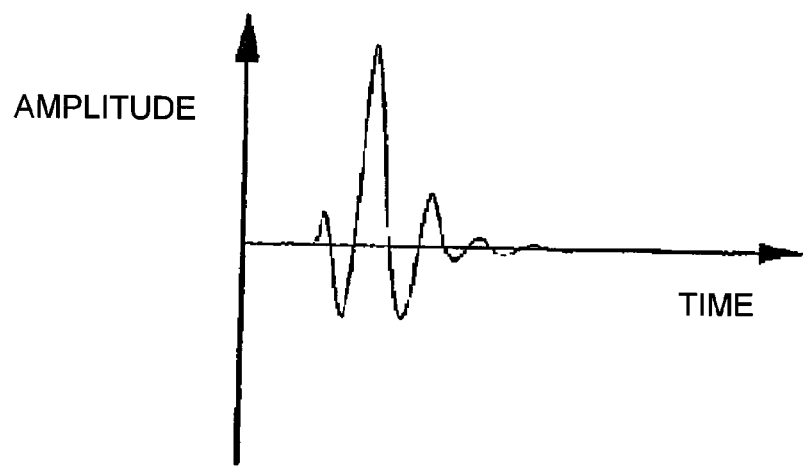
FIG. 5D is a diagram showing a signal waveform of an echo signal received by the ultrasonic transducer unit for explaining operations of the embodiment of the invention.
Figure 5E:
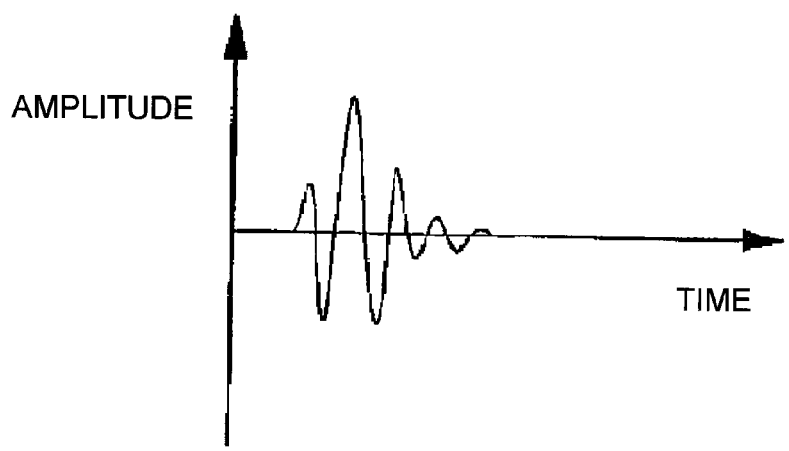
FIG. 5E is a diagram showing a signal waveform of an echo signal which has passed the analog low frequency band attenuator for explaining operations of the embodiment of the invention.
Figure 5F:
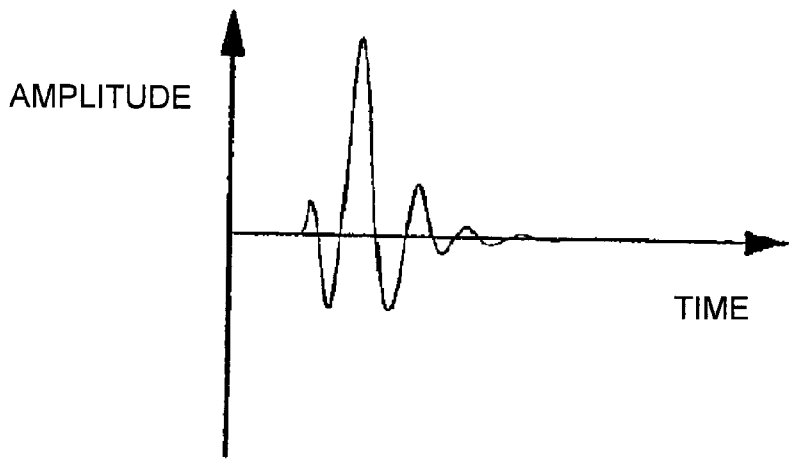
FIG. 5F is a diagram showing a signal waveform of an echo signal with a low frequency band component intensified by the digital correction filter for explaining operations of the embodiment of the invention.
Figure 6:
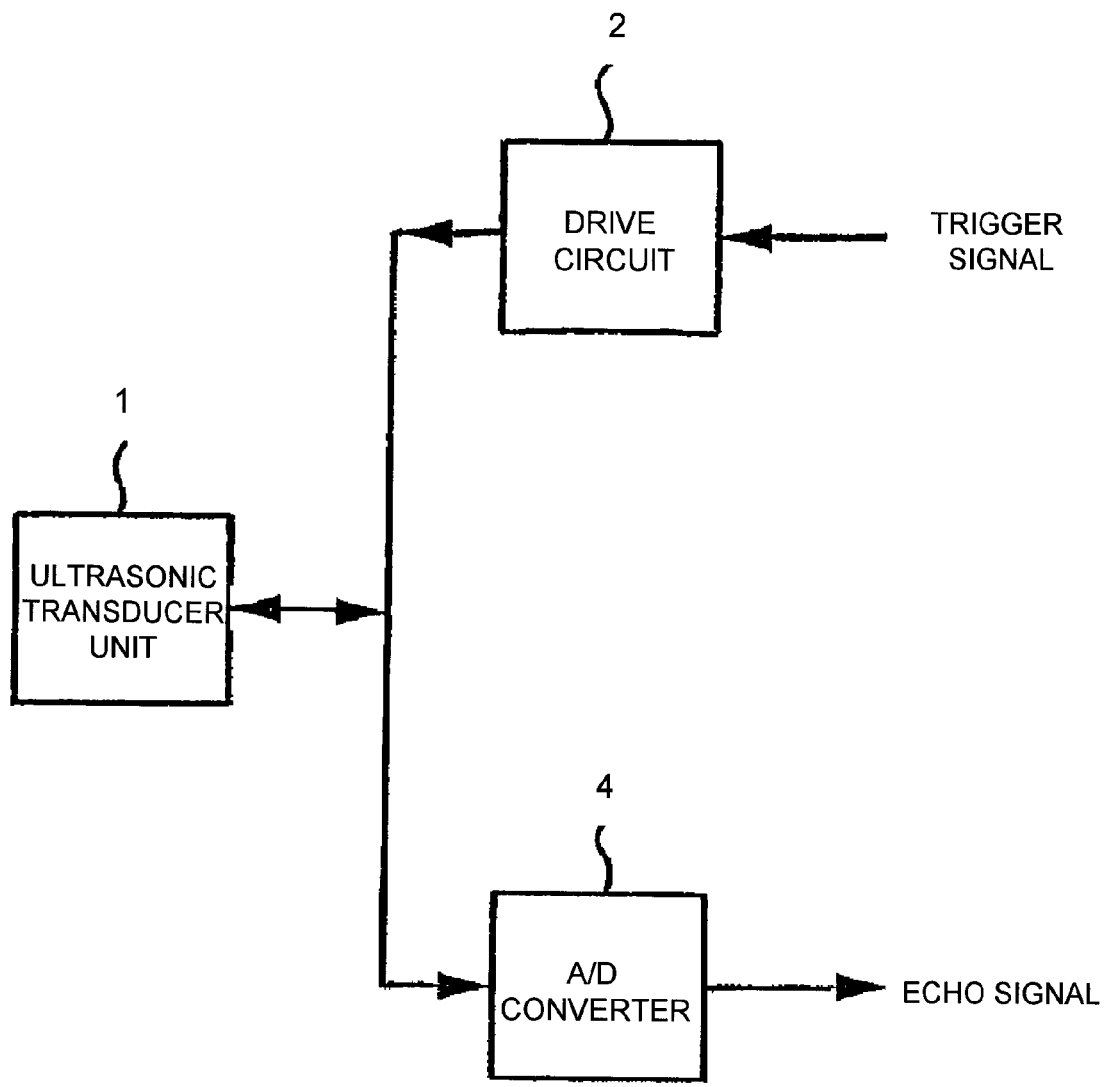
FIG. 6 is a block diagram showing a schematic structure of an ultrasonic wave transmitting/receiving section and a signal conversion section in an existing ultrasonic signal processing apparatus and an existing ultrasonic diagnostic apparatus.

FIG. 5A shows an example of a frequency distribution of an echo signal received by the ultrasonic transducer unit 1. The distribution is indicated by curved line R. When the echo signal passes the analog low frequency band attenuator 3, as shown in FIG. 5B, a low frequency band component is decreased, and the foregoing distribution is changed to the distribution as indicated by curved line S. After that, by intensifying the low frequency band component by the digital correction filter 5, as shown in FIG. 5C, the low frequency band component is compensated, and the foregoing distribution is restored to the original frequency distribution as indicated by curved line T. Therefore, while the signal waveform shown in FIG. 5D is deformed to the signal waveform as shown in FIG. 5E by the analog low frequency band attenuator 3, the deformed signal waveform is restored to the original signal waveform as shown in FIG. 5F when outputted from the digital correction filter 5.

In an actual ultrasonic diagnostic apparatus, as described above, a preamplifier and a variable gain amplifier are provided between the ultrasonic transducer unit 1 and the A/D converter 4. Meanwhile, in this embodiment, the preamplifier 31, the low frequency band attenuating filter 32, and the variable gain amplifier 33 are sequentially connected in the analog low frequency band attenuator 3. Thereby, a favorable S/N ratio can be secured. Further, for a signal after a low frequency band component is attenuated, the dynamic range is decreased. Therefore, the following advantage can be obtained. That is, a gain variable range of the variable range amplifier 33 can be small compared to a signal in the case that the low frequency band component is not attenuated.

As above, according to this embodiment, an echo signal on which a large amplitude pulse is overlaid passes the analog low frequency band attenuator 3. Thereby, it is possible that a ringing component in the low frequency band is removed, the dynamic range of the signal is decreased, and a resultant signal is inputted to the A/D converter 4.

Further, according to this embodiment, a low frequency band component of an echo signal of digital data which has previously passed the A/D converter 4 is intensified by the digital correction filter 5. Thereby, it is possible that the influence of the analog low frequency band attenuator 3 is balanced out and the relevant waveform of the echo signal is restored to the original waveform of the echo signal. In addition, echo signal information of a superficial part can be inputted to the A/D converter 4 without being saturated. Therefore, by using a low resolution A/D converter and a variable gain amplifier, a small and inexpensive ultrasonic diagnostic apparatus with superior image information output of a superficial part can be provided.

INDUSTRIAL APPLICABILITY

Since the invention is structured as above, the ultrasonic diagnostic apparatus of the invention is useful in the technical field for obtaining an ultrasonic tomogram of a test body.

The invention claimed is:

1. An ultrasonic diagnostic apparatus comprising:
   an ultrasonic transducer unit that transmits ultrasonic waves to receive an echo signal;
   a drive circuit that generates a pulse signal to drive the ultrasonic transducer unit;
   a preamplifier that amplifies the echo signal received by the ultrasonic transducer unit;
   a low frequency band attenuating filter that inputs the echo signal amplified by the preamplifier, attenuates the low frequency band component, and outputs a first resultant signal;
   a variable gain amplifier that inputs the first resultant signal outputted from the low frequency band attenuating filter, corrects an attenuated portion of the first resultant signal according to transmission time, and outputs a second resultant signal;
   an A/D converter that A/D converts the second resultant signal, as output by the variable gain amplifier, and outputs a third resultant signal; and
   a digital correction filter that intensifies the low frequency band component, which is attenuated by the low frequency band attenuating filter, of the digital signal which is converted by the A/D converter and outputted therefrom, and outputs a digital signal having a frequency distribution almost equal to that of the echo signal.

* * * * *